(12) United States Patent
Reuther

(10) Patent No.: US 7,974,984 B2
(45) Date of Patent: Jul. 5, 2011

(54) METHOD AND SYSTEM FOR MANAGING SINGLE AND MULTIPLE TAXONOMIES

(75) Inventor: Phyllis Reuther, Milbrae, CA (US)

(73) Assignee: Mobile Content Networks, Inc., Mountain View, CA (US)

( * ) Notice: Subject to any disclaimer, the term of this patent is extended or adjusted under 35 U.S.C. 154(b) by 215 days.

(21) Appl. No.: 11/737,572

(22) Filed: Apr. 19, 2007

(65) Prior Publication Data

US 2007/0250487 A1    Oct. 25, 2007

Related U.S. Application Data

(60) Provisional application No. 60/745,155, filed on Apr. 19, 2006.

(51) Int. Cl.
*G06F 17/30* (2006.01)
(52) U.S. Cl. ........ 707/777; 707/736; 707/740; 707/752; 707/737; 707/769; 707/776; 707/778
(58) Field of Classification Search .................. 707/738, 707/736–737, 740, 752, 769–770, 776–778
See application file for complete search history.

(56) References Cited

U.S. PATENT DOCUMENTS

| 5,822,720 | A |   | 10/1998 | Bookman |
|---|---|---|---|---|
| 5,845,270 | A | * | 12/1998 | Schatz et al. ..................... 706/11 |
| 6,446,061 | B1 | * | 9/2002 | Doerre et al. ................. 707/738 |
| 6,728,704 | B2 |   | 4/2004 | Mao |
| 6,795,820 | B2 |   | 9/2004 | Barnett |
| 6,895,430 | B1 |   | 5/2005 | Schneider |
| 6,941,302 | B1 | * | 9/2005 | Suchter ............................... 1/1 |
| 7,162,480 | B2 | * | 1/2007 | Vishik ........................... 707/616 |
| 7,296,020 | B2 | * | 11/2007 | Gerstl et al. ................... 707/740 |
| 7,792,838 | B2 | * | 9/2010 | Ranganathan et al. ........ 707/739 |
| 2003/0120662 | A1 | * | 6/2003 | Vishik ........................... 707/100 |
| 2003/0167267 | A1 | * | 9/2003 | Kawatani ........................... 707/6 |
| 2004/0030723 | A1 | * | 2/2004 | Gerstl et al. ............... 707/104.1 |
| 2006/0053099 | A1 |   | 3/2006 | Gardner |
| 2006/0053175 | A1 | * | 3/2006 | Gardner et al. ............... 707/203 |
| 2006/0053382 | A1 |   | 3/2006 | Gardner |
| 2007/0220035 | A1 | * | 9/2007 | Misovski ...................... 707/102 |

OTHER PUBLICATIONS

Pollock, Jeffrey T. et al., Adaptive Information Improving Business Through Semantic Interoperability, Grid Computing, and Enterprise Integration, Sep. 21, 2004, John Wiley & Sons, pp. 148 and 149.*
J.M. Taylor et al., "Domain-Specific Ontology Merging for the Semantic Web", North American Fuzzy Information Processing Society, 2005, pp. 418-423.
N.F. Noy, "Tools for Mapping and Merging Ontologies", Handbook on Ontologies, Springer, Heidelberg, DE, Jan. 2004, pp. 365-384.
International Search Report.

* cited by examiner

*Primary Examiner* — Frantz Coby
(74) *Attorney, Agent, or Firm* — Hunton & Williams LLP

(57) ABSTRACT

A system and method may include retrieving a first taxonomy comprising at least one first category and one or more second taxonomies, at least one second category being associated with at least one of the one or more second taxonomies. The system and method may further include creating a new taxonomy by merging the first taxonomy with the second taxonomy based on a comparison of a first category profile of the at least one first category with a second category profile of the at least one second category.

20 Claims, 6 Drawing Sheets

Example Controlled Vocabulary: Product Brand Names 500

$$\left\{\begin{array}{ll} \text{Armani} & \text{Hermes} \\ \text{Calphalon} & \text{Le Creuset} \\ \text{Cuisinart} & \text{Panasonic} \\ \text{DKNY} & \text{Sony} \\ \text{Fujitsu} & \text{Tommy Hilfinger} \\ \text{Henckels} & \text{Vera Wang} \end{array}\right\}$$

METHOD AND SYSTEM FOR MANAGING SINGLE AND MULTIPLE TAXONOMIES

CROSS REFERENCE TO RELATED APPLICATIONS

This application claims the benefit U.S. Provisional Application No. 60/745,155, filed Apr. 19, 2006, titled "Methods and Apparatus for managing single and multiple taxonomies," the contents of which are incorporated herein by reference in their entirety.

FIELD OF THE INVENTION

The present invention may relate to methods and apparatuses for creating, maintaining, and managing single and multiple taxonomies used by computer software and hardware to provide or improve information search and retrieval, content analysis, and classification or categorization of electronically available content: text, data, and "digital content" (i.e. images, software, multimedia).

BACKGROUND INFORMATION

Inexpensive computer and networking technologies have made increasingly large quantities of digital content available electronically via wired and wireless networks, resulting in information overload as users have access to significantly more information than they can consistently and reliably locate.

Previously, physical content collections, such as private and public libraries of printed publications, including, but not limited to books, coins, maps, and drawings, have been managed by human librarians who have developed taxonomic structures describing the collection's content, and who then impose the structure on the physical collection by examining and assigning each content item to a relevant category or categories. While this manual process may be manageable when the content collection increases slowly, the current, rapid proliferation of digital content, both textual and multimedia, can overwhelm the editorial staffing of any content collection holder.

The resulting proliferation and commoditization of information search and retrieval technologies have created an increasing number of proprietary commercial data, media and text collections, independently indexed and maintained by content sources. These content sources have limited economic incentive to make their digital content fully accessible for indexing by public search engines and the public search engines attain more economic benefit by having the sources as advertisers than by providing search engine users with direct access to the actual content.

In addition to traditional content access via stationary computers, there has been an explosive proliferation of Internet access using mobile computing devices such as laptops, personal digital assistants (PDAs), and mobile telephones. This proliferation of mobile devices is markedly changing the nature of content availability as publishers reformat and reorganize their content for mobile Internet access.

While a desktop computer user can comfortably search for information, using multiple tries and browsing, mobile computing users are generally limited by small screen and input ergonomics, location-specificity, and their own mobility. Due to these constraints, mobile computing users are less likely to want to receive all possibly relevant results, and more likely to want specific information immediately.

The changing nature of content access by a mobile population plays a large part in increasing the value of information retrieval precision over recall with new search and retrieval processes emphasizing the highest possible precision for the first five to ten entries of the results set. For the same reasons, mobile users also require the shortest path to their desired content. Therefore, publishers have a greater incentive to organize their content in information architectures that facilitate access to groups or categories of content.

As alternatives to single publisher search engines or large-scale public search engines, federated searching across multiple content sources improves the chance that a user will get a relevant response to their query. However, content publishers may have organized their content using different information architectures or "taxonomies."

Generally, a taxonomy may be a controlled vocabulary organized hierarchically to represent relationships between terms in the controlled vocabulary. A taxonomy category may be a labeled vocabulary term or group of related vocabulary terms. For example, a set of product vendor names might be the controlled vocabulary for a department store and the categories may be the names of the store departments (e.g. Shoes, Housewares, Appliances).

Different taxonomies can be created from the same controlled vocabulary, depending on how the vocabulary is grouped into categories and how the resulting categories are arranged with respect to each other.

Significant practical and commercial value has been provided by automated taxonomy development and classification technologies, the goal of which is to organize the information in a given content collection into groups of similar content, label and arrange each group appropriately, and display the group organization of greatest utility to a user accessing the collection.

The resulting proliferation of taxonomy management and classification technologies has generated an increasing number of public taxonomies, used primarily as navigation directories or "browsing search", such as is found on the Yahoo!, Amazon, and eBay websites, to facilitate access to the proprietary content available from content publishers, centralized public search engines, or content aggregators.

The present invention relates in particular to methods and a system for an improved taxonomy management system which leverages pre-existing taxonomies and categorized content to automatically create, maintain, and manage new taxonomies with minimum effort and greater control by information architects and content publishers.

SUMMARY OF THE INVENTION

Accordingly, one aspect of the invention is to address one or more of the issues set forth above. According to an exemplary embodiment of the present invention, a computer implemented method comprising the steps of: retrieving a first taxonomy comprising a first plurality of categories, retrieving one or more second taxonomies, a second plurality of categories being associated with the one or more second taxonomies, comparing a category profile of each of the first plurality of categories to a category profile of each of the second plurality of categories to identify matching categories and non-matching categories, and creating a third taxonomy that includes the matching categories and the non-matching categories.

In accordance with another exemplary embodiment of the present invention, a computer implemented method comprising the steps of retrieving a first taxonomy comprising at least one first category and one or more second taxonomies, at least one second category being associated with at least one of the one or more second taxonomies, and creating a new taxonomy by merging the first taxonomy with the second taxonomy based on a comparison of a first category profile of the at least one first category with a second category profile of the at least one second category.

According to an exemplary embodiment of the present invention, a computer implemented system comprising a first content source communicatively coupled to a network, the first content source to store a first taxonomy having at least one first category, a second content source communicatively coupled to the network, the second content source to store a second taxonomy having at least one second category, a client device communicatively coupled to a network, the client device to generate data identifying a first taxonomy and a second taxonomy, and a server communicatively coupled to the network, the server to receive the data and to retrieve the first taxonomy and the second taxonomy, the server being further configured to create a new taxonomy by merging the first taxonomy with the second taxonomy based on a comparison of a first category profile of the at least one first category with a second category profile of the at least one second category.

According to an exemplary embodiment of the present invention, a computer implemented apparatus for processing a query, the apparatus comprising a source connector module to retrieve a first taxonomy and a second taxonomy from one or more content sources, the first taxonomy having at least one first category and the second taxonomy having at least one second category, a category content module to generate a content category profile for the at least one first category and the at least one second category; and a taxonomy merge program module to create a new taxonomy by merging the first taxonomy with the second taxonomy based on a comparison of a first category profile of at least one first category with a second category profile of at least one second category.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DETAILED DESCRIPTION OF EXEMPLARY EMBODIMENT

Figure 1:
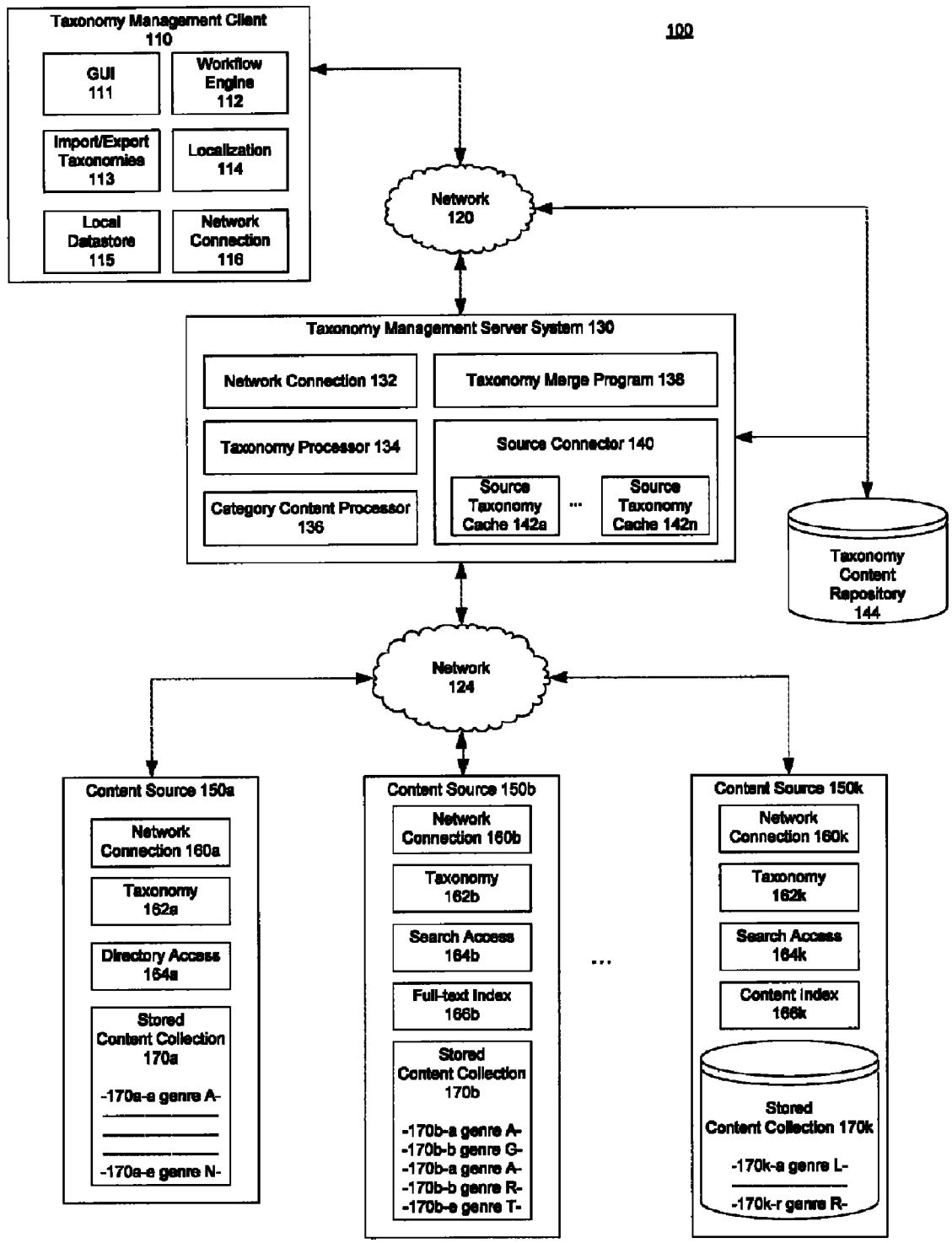
FIG. 1 is an exemplary diagram of a system for managing single and multiple taxonomies in accordance with exemplary embodiments of the present disclosure.

While the description and drawings represent preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied on other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description. Furthermore, it should be noted that the order in which the process is performed may vary without substantially altering the outcome of the process.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

The following definitions are merely exemplary and referenced herein to illustrate the various embodiments of the present invention described below. The embodiments and scope of the inventions are not limited by the definitions set forth below.

Search engine: may refer to computer programs designed to index, store and retrieve information based on instructions from the user via a query. A process that executes an individual search against a single collection is called a search engine. A process that executes a search against multiple search engines and/or databases and combines results is known as a federated or meta-search engine.

Content Source or Content Publisher: may refer to a publisher having collections of digital or non-digital content available via a network.

Query: may refer to a request that describes or identifies information or data being sought by the user or the taxonomy management system. The query may include various combinations of text, non-text, and/or categories. For example, queries may include keywords (e.g., terms, phrases, natural-language sentences), as well as non-text queries (e.g. multimedia such as pictures or audio clips, and/or numerical queries such as auction bids, purchase prices, or travel dates), and/or categories (e.g. music genres such as Rock, Pop, or Urban).

Various combinations of query types and formats may be applied. For example, in the case of a travel reservation, a query may include a date range, departure and destination city pair and/or a number of people traveling. In the case of an audio file, the query may include verbal or musical phrases as well as artist names, song titles, etc. In more complex scenarios, a query may be characterized in terms of stock quotes, stock price derivatives, signal patterns, or isobars.

The user or taxonomy management system may transmit a query through a network. Further, the user may use a computer or other communication device to transmit a query.

Stored Query: The user or taxonomy management system may pre-program frequent searches, such as subject category or source taxonomy queries with no change to the underlying technology.

Results Item: An atomic piece of information. A results item is returned in response to a query and is used to refer to a specific document. Results items may include location of the information resource, and various other metadata values such as description, title, price, etc.

Results Set: A list of results items returned from in response to a query.

Categorization: may be defined as the placement of entities in groups, potentially hierarchical structured as taxonomies, whose members bear some similarity to each other. Categorization systems may involve the assignment to a resource of one or more group labels intended to represent the intellectual, functional, or conceptual content of that resource. These labels are usually drawn from a controlled vocabulary that normalizes the terminology and provides for communication between the information retrieval system and the individual or several information retrieval systems by specifying a set of authorized terms or labels that can be used to pose search queries.

Taxonomy: may be a hierarchically-arranged controlled vocabulary used to organize content items in a collection. Internet search engines may have one or more associated taxonomies to facilitate browsing search of the content collection. Web application developers and marketing may have split the organization of resources into two separate representations to satisfy the organizational uses of different stakeholders. A single taxonomy node is called a category. Navigational or browsing search technology may use a taxonomy as the organizational medium for user access to stored digital information. A multi-level set of associated taxonomies are often used to satisfy the disparate needs of displaying a simple structure to end users and providing the detailed structure required for accurate categorization.

Reference Taxonomy: may be fine-grained, monotonically expanding taxonomy used as a structure for manual or machine classification of the content items stored in the local collection. Reference taxonomies may be structures used as a basis for categorizing stored content. Reference taxonomies may vary by type and subject served by search and information retrieval engines. Similar types of content or content from similar subject areas may be organized within the same reference taxonomy. In a multi-taxonomy system, the reference taxonomy may be the union of all the categories represented in the many source taxonomies.

Display Taxonomy: may be a subset of the reference taxonomy and is used for display to individuals accessing the content. Display taxonomies may be concise, highly-mutable taxonomies presented to and navigated by an end user and may change frequently to satisfy market requirements. A display taxonomy may be more mutable than the reference taxonomy because it is used to display categories for individual browsing searches and content publishing staff may determine that it is more important to highlight different areas of content for in different time periods or for different target user groups. Changes to the display taxonomy rarely generate changes in the reference taxonomy to minimize content recategorization. In a multi-taxonomy system, the display taxonomy may be initially or in whole the intersection of the categories represented in the many source taxonomies.

Source Taxonomy: a publicly available taxonomy representing the content available at a content publisher accessible. In a federated search system, there may be three levels of content organization. For example, in addition to the display taxonomy viewable by individuals and a reference taxonomy level for organizing the resources available in the meta-collection, the content publisher display taxonomies are indirectly available for user browsing.

Exemplary embodiments of the present disclosure relate to a method and system for managing single and multiple taxonomies. The exemplary methods and an apparatuses may permit manual and automatic creation and management of taxonomies utilizing pre-existing single and multiple taxonomies. The exemplary methods and apparatuses may provide for creation, maintenance, and storage of multiple taxonomies.

Because automatically generated taxonomies might not match common sense expectations for the organization of a large content collection with a high diversity of topics, the exemplary embodiments described herein provide a detailed description of the administrative tools used to manually edit taxonomies, evidence structures, and metadata to improve the classification and navigational ease of use of taxonomies.

The exemplary embodiments of the present disclosure may describe methods and apparatuses for managing taxonomies used by computer software and hardware for classification and categorization engines and for information search and retrieval platforms for network accessible text, data, and digital content collections. The exemplary embodiments of the present disclosure may facilitate generation of taxonomies, small or large, at differing levels of category granularity, including development of associated evidence structures necessary as category profiles for categorization processes. The exemplary embodiments of the present disclosure may also provide maintenance and error processing based on analysis of both pre-classified content and access usage patterns.

Moreover, the exemplary embodiments of the present disclosure may include administrative processes and tools for taxonomy management including a graphical user interface (GUI), taxonomy import and export, localization and translation, user and role processing, error analysis, and reporting. The GUI may provide manual and automatic taxonomy editing, including workflow with approval cycles, automatic change history, and taxonomy error correction functions, such as, but are not limited to, new category creation, enhancing categorization evidence structures, and automatic and manual inter- and intra-taxonomy mapping.

FIG. 1 is an exemplary diagram of a system 100 for managing single and multiple taxonomies in accordance with exemplary embodiments of the present disclosure. FIG. 1 depicts a system level diagram with network connections and component level processing modules. The term module may refer to computer hardware, software, firmware, other instruction processing devices, and/or combinations thereof. The components of system 100 may be further duplicated, combined and/or separated to support various applications of the embodiments of the present disclosure. Additional elements may also be implemented in the system to support various applications.

The Taxonomy Management Client 110 may permit a user to manage single and multiple taxonomies. The Taxonomy Management Client 110 may include a mobile device or other communication device, including a terminal, such as, but not limited to, a kiosk or desktop computer. The Taxonomy Management Client 110 may include a graphical user interface application interacting with a local relational database to manage multiple taxonomy inputs and a Taxonomy Content Repository 144. The Taxonomy Management Client 110 may facilitate rapid development of display and reference taxonomies (for usability testing and distribution channel needs) and may create intra- and inter-taxonomy mappings. The Taxonomy Management Client 110 also may facilitate category and evidence creation, taxonomy management, storage, error analysis, and translation. The Taxonomy Management Client 110 additionally may input and store category profiles including evidence term weights, may manage taxonomy workflow processes including review and approval, and may provide bulk taxonomy import/export to files. The Taxonomy Management Client 110 may be connected to the Taxonomy Content Repository 144 and/or the taxonomy management processing modules of the Taxonomy Management Server System 130 via a network 120, as will be discussed in further detail below.

The Taxonomy Management Client 110 may include a graphical user interface module 111, a workflow engine module 112, an import/export taxonomies module 113, a localization module 114, a local data store 115, and a network connection 116.

The graphical user interface module 111 may present a graphical user interface to a user of the Taxonomy Management Client 110 to permit the user to perform various functions on taxonomies. The graphical user interface module 111 may implement, for example, a drag and drop graphical user interface application. The graphical user interface module 111 may present a taxonomy editing tool to the user. The taxonomy editing tool may include workflow and content management functionality including user and role processing, authentication, change history, staging/production cycle awareness, review, approval, and annotation. Separate versions of the taxonomy editing may enforce read/write/approve functions for particular user roles.

The user roles may include a Display Editor Role, a Domain Editor Role, a Manager Role, and an Administrator Role. The Administrator Role may, for example, permit a user to develop a taxonomy, to map and/or translate between multiples taxonomies, to create users, and to set user roles and permissions. The Display Editor Role may permit a user to create, update, and delete their own display taxonomies and to read a limited selection from a reference taxonomy. The Domain Editor Role, which also may be referred to as an Ontologist Role or as a Librarian Role, may permit a user to develop display and reference taxonomies and to map and/or translate between multiple taxonomies. Taxonomy editing functionality may be limited to the Domain Editor Role's subject domain, such as, for example, Natural History or Music. The Manager Role may permit a user to develop any taxonomy, to map and/or translate between taxonomies, and to approve changes by Domain and Display Editors Roles.

The workflow engine module 112 may be able to manage the operational aspect of a taxonomy creation and maintenance procedure, including: but not limited to, structuring review and approval tasks, who performs which task, what their relative order is, how tasks are synchronized, how information flows to support the tasks, and how tasks are being tracked.

The import/export taxonomies module 113 may perform an import/export function to facilitate bulk upload of taxonomies from various data file formats, such as, but not limited to, eXtensible Markup Language (XML), Web Ontological Language (OWL), Excel, plain text format files, and other available data file formats. The import function may read the taxonomy specifics, including, but not limited to, metadata, categories, evidence terms, and inter- and intra-taxonomy mappings from the data file. The import function may create a representation of the taxonomy inside the Taxonomy Management Server System 130, and may store a representation of the taxonomy in the Taxonomy Content Repository 144. The export function may read the taxonomy representation from the Taxonomy Management Server System 130 or the Taxonomy Content Repository 144 and may write the taxonomy, including metadata, categories, evidence terms, and mappings to an external file. Taxonomy import and export functions may be extensible to allow input/export in alternate formats, including, but not limited to, Microsoft Excel spreadsheets, plain text, OWL and XML files, using proprietary and standard taxonomy schemas (e.g. those supported by the Open Directory Project (DMOZ) and the Universal Standard Products and Services Classification (UNSPSC) taxonomy) to facilitate manual update from taxonomists, ontologists, translators, editors, and publishers. In addition, the import/export taxonomies module 113 can switch from taxonomy to thesaurus mode to display, import, or export content in standard thesaurus formats (e.g. Simple Knowledge Organisation System (SKOS) and NISO thesaurus creation standard Z39.19).

The localization module 114 may perform taxonomy localization. Each taxonomy metadata, category label, and categorization evidence term may have properties specifying regional characteristics such as, but not limited to, language, country, and character set encoding. The localization module 114 may permit the user to directly edit the taxonomy and add metadata, category label, and term translations by a combination of manual and automatic processes. The localization module 114 can be used to manually localize the taxonomies, or to import/export the files for localization by external translators, or to manage automated translation processes with human review cycles. The taxonomy category labels may be translated, where possible, using terminology from source taxonomy which have versions in both the base and target languages. Additional, the localization module 114 may perform automated methods to initiate the taxonomy localization, using translation dictionaries, automated machine translation processes, manual translation, and/or combinations thereof.

The local data store 115 may permit storage of working copies of taxonomies during creation, maintenance, and review cycles.

The network connection 116 may permit the Taxonomy Management Client 110 to communicate via network 120, which may include the Internet or other network, to a Taxonomy Management Server System 130.

The Taxonomy Management Server System 130 may communicate through network 120 by wired or wireless network connection to the Taxonomy Management Client 110 and may further communicate through network 124 to content sources (e.g., external Content Sources 150*a*, 150*b*, . . . 150*k*,), Stored Content Collection modules 170 (as represented by Databases) and/or Other Sources, e.g., "on-deck" content sources.

The Taxonomy Management Server System 130 may include various modules to perform functionality associated with querying, retrieving and/or other processing. For example, the Taxonomy Management Server System 130 may include a Network Connection module 132, a Taxonomy Processor module 134, a Category Content Processor module 136, a Taxonomy Merge Program module 138, a Source Connector module 140, one or more Source Taxonomies Caches 142*a* . . . 142*n* and/or other module(s). The various components of Taxonomy Management Server System 130 may be further duplicated, combined and/or integrated to support various applications and platforms. In addition, the modules, caches and other components may be implemented across multiple systems, platforms, applications, etc. Additional elements may also be implemented in the system to support various applications.

The Network Connection module 132 may manage a balanced exchange of data across network 120, network 124 and/or other networks and communication portals.

The Taxonomy Processor module 134 may mine a saved taxonomy or taxonomies, including querying source taxonomies and content to create category content profiles and evidence terms to create new taxonomies and maintain existing taxonomies. The Taxonomy Processor module 134 may also mine a saved taxonomy browsing history and user queries to augment and improve taxonomy automation process and to provide personalization services for the user, including search services; advertising recommendations; related categories; and query disambiguation.

The Category Content Processor module 136 may mine Content Source 150 stored content collections and generate category profiles and evidence term lists with membership weights using any relevant machine learning process and algorithms such as Support Vector Machines (SVM) or k-Nearest Neighbor (knn) classification, depending on the content type and available metadata. The Category Content Processor 136 may analyze documents pre-classified at Content Sources 150 using source taxonomies 162 for use by the Taxonomy Merge Program module 138 to suggest mappings between taxonomy categories.

The Taxonomy Merge Program module 138 may manage the process of creating the new taxonomies by merging one or more existing taxonomies using, for example, a tree traversal algorithm such as, but not limited to, a breadth-first search, and by comparing category content profiles generated by the Category Content Processor module 136.

The Source Connector module 140 contains the framework for querying the content publishers for taxonomies and content, formatting the request appropriate to the source requirements, and processing the response from the source, reformatting it from publisher-specific formats, into internal XML formats.

The Content Sources 150*a* . . . 150*k* facilitate information retrieval from their content collections using several modules. The Content Sources 150 may communicate through Network Connections 160*a* . . . 160*k* by wired or wireless network connection to the Taxonomy Management Client 110 and to the Taxonomy Management Server System 130 or other programs. Search Engine Access modules 164*a* . . . 164*k* may provide for parsing the incoming query using the search engine proprietary indexing algorithm, matching the query to the content index, and returning results sets that include metadata such as the description and location of the matching content items. Content Indices 166*a* . . . 166*k* may include a storage mechanism and computer program that may include metadata, text and/or other attributes from the resources contained in the content source's 150 content collection. The Stored Content Collection modules 170*a* . . . 170*k* may include resources, multimedia, and/or other content indexed by the search engine, referenced by the metadata and accessible via the location listed in the results set.

The Search Engine Access modules 164*a* . . . 164*k* may pre-index a collection of content items (e.g. document, image, web site), then, in response to a query, examine collections in one or a group of computers for content items that satisfies the query and return an ordered list of possible matches as a category content item results set. A result item metadata that indicates relevance ranking, which may imply how closely the content item matches the query, may be explicitly returned or may be given implicitly in the order of items in the category content item results set, usually with the most relevant content item at the top of the ordered list. Rankings may be based on a numerical similarity scoring value or one of many possible metrics previously computed against the content and stored with the full-text or database index or indexes by the content publisher.

The Search Engine Access modules 164*a* . . . 164*k* may vary and may include at least three types: centralized indexing, metasearch, and federated search engines. Each type may be used to conduct searches against different types of content item collections. For example, centralized indexes may be used to facilitate searches over fully accessible, homogeneous content, such as is found in single enterprise content management systems or the plethora of publicly available, internet-enabled websites.

Different Content Sources 150 may index their content item collections using different algorithms or by processing the same algorithms against different sections of text and/or metadata. Thus, in some instances, local source calculated ranking statistics and classifications may not be compared directly when combining categories.

The modules and other components of Content Sources 150 may be implemented across multiple systems, platforms, applications, etc. Additional elements may also be implemented in the Content Source systems to support various applications.

The Stored Content Collection modules 170 may include data items such as collection items [170*a-a* . . . 170*a-e*], and [170*a-a*, 170*a-b*, 170*b-a*, 170*b-b*, 170*b-e*]. For example, content items may appear in one collection, as in content items [170*a-a* . . . 170*a-e*]. However, content items may also appear in more than one collection, as depicted by the overlap of the content sets [170*a-a*, 170*a-b*] in Stored Content Collection modules 170*a* and 170*b*.

According to an embodiment of the present disclosure, the Source Connector module 140 may receive source taxonomies 162 from the individual Content Sources 150 (e.g., search engines, databases, other sources of data, etc.) and may further store the source taxonomies 162 in the Source Taxonomy Caches 142*a* . . . 142*n* while awaiting processing by the other modules. A Source Taxonomy Cache 142 may contain a source taxonomy 162 returned from a Content Source 150 in response to a query. Source Taxonomy Caches 142 may also have an associated unique cache key which may include source identification, query or category terms, and/or other factors to facilitate reuse.

Query-specific Source Taxonomy Caches (e.g., Source Taxonomy Caches 142*a* . . . 142*n*) may store taxonomies and/or content returned from Content Sources 150*a* . . . 50*k* for processing at Category Content Processor module 136. The Category Content Processor module 136 may then analyze the content, create category content profiles, and store profiles in the Taxonomy Content Repository 144 for use by the Taxonomy Merge Program module 138.

The Taxonomy Merge Program Module 138 may create a new taxonomy from one or more source taxonomies. The Taxonomy Merge Program Module 138 also may include a process to extract, validate, and update a taxonomy from one or more content source taxonomies. The Taxonomy Merge Program Module 138 also may include a process to automatically compare content of two or more taxonomies and may suggest matching categories in a new taxonomy. These processes, for example, may also be attached to web spiders that may crawl the Internet and locate new Content Sources 150 containing similar content.

The Taxonomy Merge Program Module 138 may provide creation and maintenance of a taxonomy (from multiple pre-existing taxonomies and their associated documents), intra-taxonomy mappings (between categories in the same taxonomy), inter-taxonomy category mappings (between categories in different taxonomy), categorization maintenance: mitigate category and evidence drift and obsolescence, generate taxonomy extension, categorization error analysis, and review and approval workflow for verifying taxonomy, category, evidence, and metadata creation, update, and translation. The Taxonomy Merge Program Module 138 also may analyze documents pre-classified at Content Sources 150 using source taxonomies to suggest mappings between taxonomy categories. Each of these processes is discussed below with reference to FIGS. 2-4.

Figure 2:
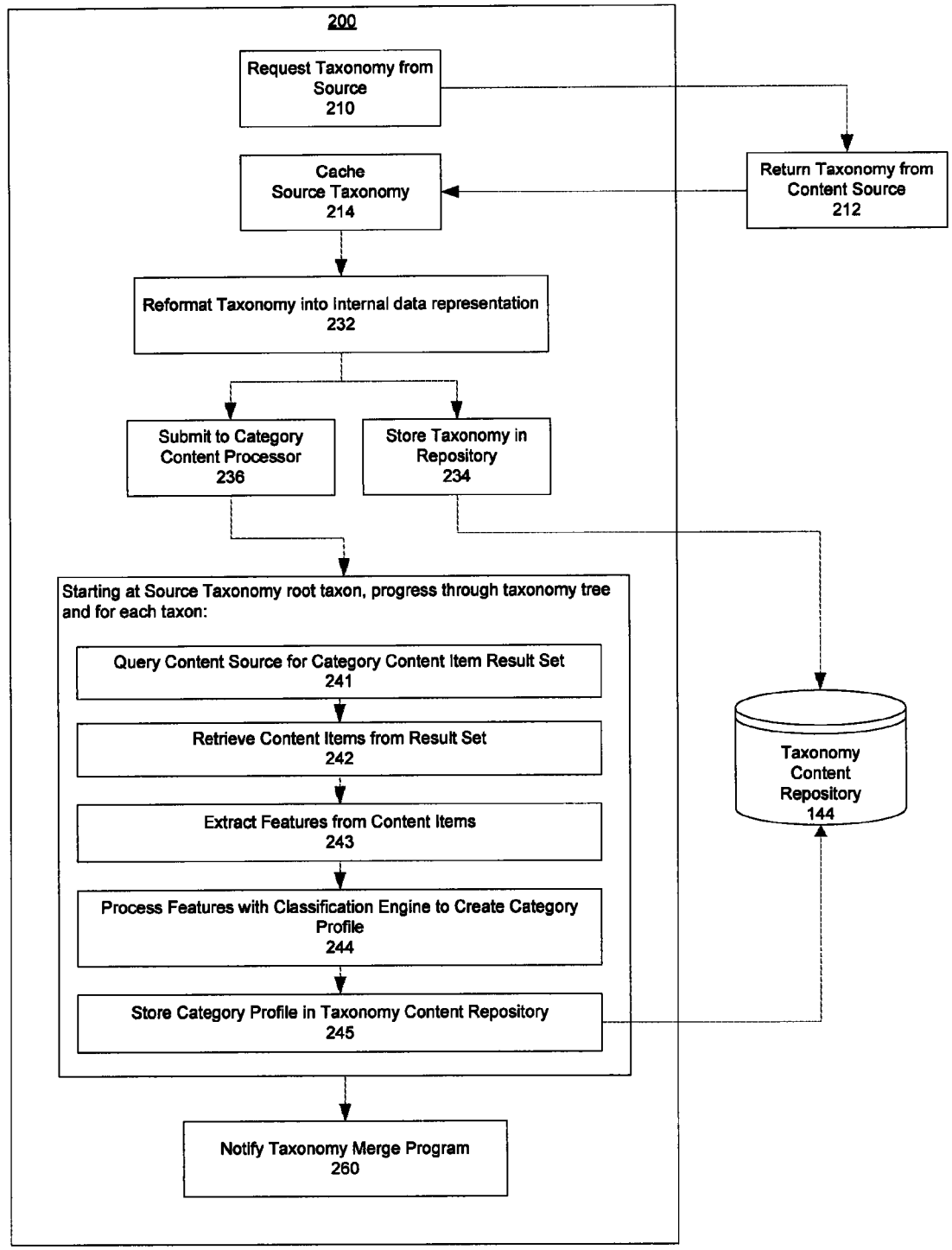
FIG. 2 illustrates an exemplary flow diagram of a process by which extant taxonomies are retrieved and processed to create taxonomy category profiles and content profiles in accordance with exemplary embodiments of the present disclosure.
Figure 3:
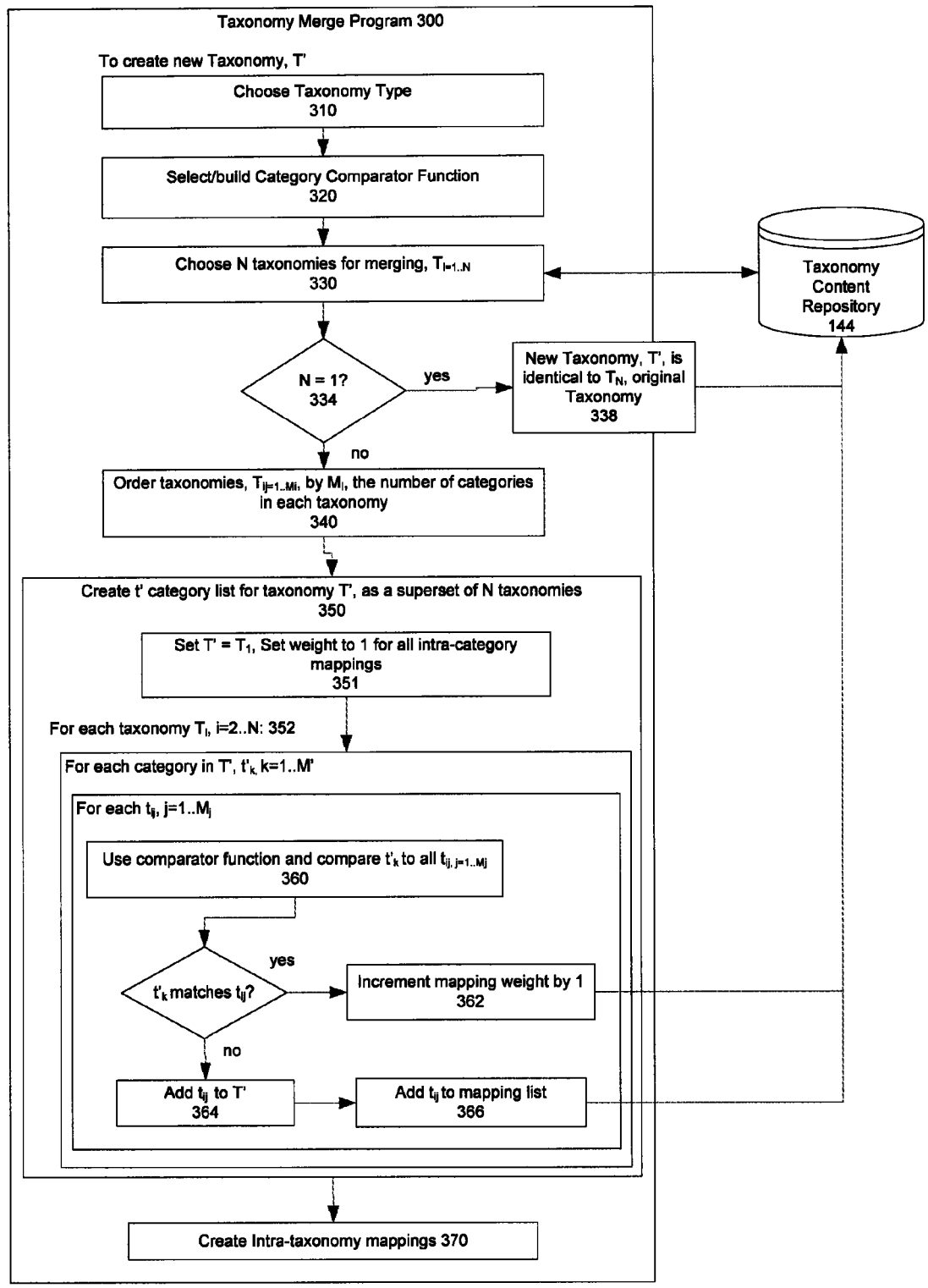
FIG. 3 illustrates an exemplary flow diagram of a taxonomy merge process performed by the Taxonomy Merge Program module by which one or more taxonomies are merged to create a new taxonomy T' in accordance with exemplary embodiments of the present disclosure.
Figure 4:
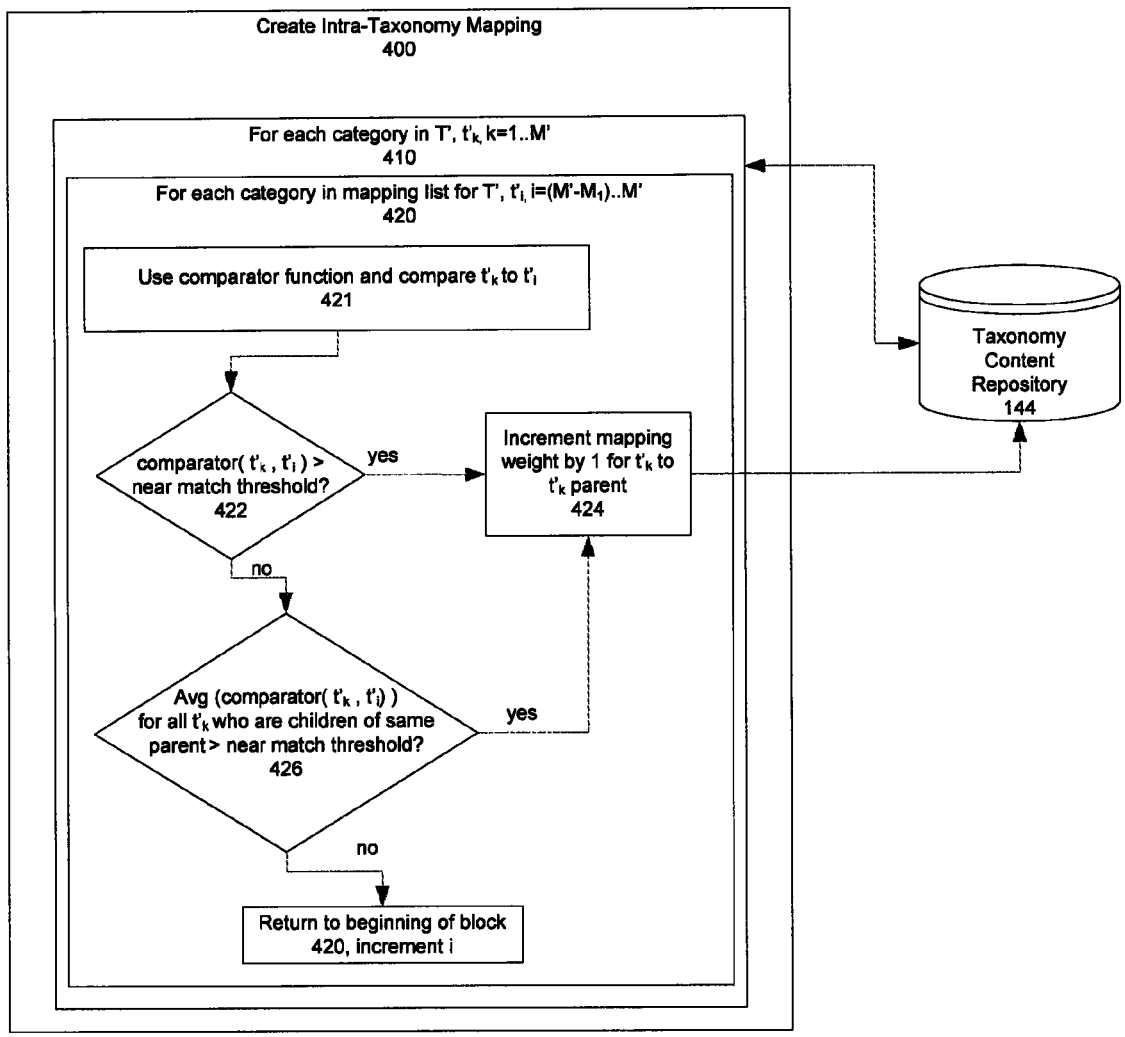
FIG. 4 illustrates an exemplary flow diagram of an intra-taxonomy category mapping process performed by the Taxonomy Merge Program module by which one or more taxonomies are merged to create a new taxonomy T' in accordance with exemplary embodiments of the present disclosure.

FIG. 2-4 illustrate a flow diagram of a method in accordance with exemplary embodiments of the present disclosure. This exemplary method is provided by way of example, as there are a variety of ways to carry out methods according to the present disclosure. The method shown in FIGS. 2-4 can be executed or otherwise performed by one or a combination of various systems. The method is described below as being carried out by the system 100 shown in FIG. 1 by way of example, and various elements of the system 100 are referenced in explaining the example methods of FIGS. 2-4. Each block shown in FIGS. 2-4 represents one or more processes, methods or subroutines carried in the exemplary methods.

FIG. 2 illustrates an exemplary flow diagram of a process by which extant taxonomies are retrieved and processed to create taxonomy category profiles and content profiles in accordance with exemplary embodiments of the present disclosure. The flow diagram 200 may begin at block 212.

In block 210, the Source Connector module 140 may request a source taxonomy from a Content Source 150. In block 212, the Content Source 150 may receive the request and may return the requested source taxonomy to the Source Connector module 140. In block 214, the Source Connector module 140 may store the source taxonomy in a Source Taxonomy Cache 142.

In block 232, the Taxonomy Processor module 134 may reformat the source taxonomy from the publisher's preferred format into a format used by the Taxonomy Management Server System 130. For example, the Taxonomy Processor module 134 may reformat the source taxonomy into a Web Ontology Language (OWL) representation to capture taxonomy categories, metadata, and intra-taxonomy mappings in a consistent format.

Once reformatted, in block 234 the Taxonomy Processor module 134 may store the reformatted source taxonomy in the Taxonomy Content Repository 144.

In block 236, the Taxonomy Processor module 134 may submit the reformatted source taxonomy to the Category Content Processor module 136.

Starting at a root category, the Category Content Processor module 136 proceeds to each category within the source taxonomy and may complete each of blocks 241-245 discussed below. In block 241, the Category Content Processor module 136 may query the Content Source 150 associated with the source taxonomy for a category content item result set. The category content item result set may identify all of the content items in the source taxonomy associated with a particular category. For example, the category content item result set may include a list of the current news headlines or all the downloadable Pop music ringtones. For each content item in the category content item result, the Category Content Processor module 136 may identify a taxonomy category label, metadata associated with each content item, and also may scrape content of interest from websites/pages.

In block 242, the Category Content Processor module 136 may retrieve from the Content Source 150 each of the content items identified in the category content item result set.

In block 243, the Category Content Processor module 136 may extract features from each of the retrieved content items. The extracted features may be used to create a category content profile by determining relevant evidence terms from the content items that may be used to categorize a content item within a particular category of the taxonomy. The evidence terms may include, for example, any non-stopword terms (e.g., words other than "a," "the," "but," etc.); n-term phrases (e.g., 3 character text breakdown, such as "ran dom ter ms" for "random terms"); proper nouns (e.g., people, places, things); metadata (e.g., artist name, file size, image dimensions, price, color, location); structural emphasis indicators (e.g., headlines, titles, or abstracts); and/or derived statistics. The derived statistics may be, for example, a ratio of a number of images to a number of words in the text; an indicator that the content item contains phone number, address, or price; the number of times a particular term appears in the content item; or other statistics indicating the presence or absence of words, images, or other measurable items included in the content item.

In block 244, for a representative set of the content items (e.g., some or all of the content items) associated with a particular category within the taxonomy, the Category Content Processor module 136 may process the extracted features to create a category profile for each of the categories within the taxonomy. For example, the Category Content Processor module 136 may read a text page from the category "Diseases" containing the phrase "Reducing inflammation may help prevent cancer, suggest two Mayo Clinic studies presented Monday at the annual meeting of the American Association for Cancer Research in Los Angeles". A content profile for this page in the "Diseases" category may be created such as: [reducing inflammation 1, cancer 2, research 1, Mayo Clinic 1, studies 2]. A content profile for a different article having the text "Authors of a new study of antidepressants for children and teenagers say the benefits of treatment trump the small risk of increasing some patients' chances of having suicidal thoughts" may be created such as: [antidepressants 1, suicidal thoughts 1, study 1]. A category profile is created by analyzing the set of content profiles for all the content in a category and generating a profile which contains the most useful of the features, with membership weights, for identifying membership of a text in that category. For the example "Diseases" category, the profile may be determined to be: [inflammation 0.5, cancer 1, suicide 0.5, studies 1.5].

The Category Content Processor module 136 may determine evidence term weights in the category content profile by generating a list of terms associated with a particular content item, by generating document by term/content item frequency matrix, by processing the matrix to get a normalized (to [0,1]) similarity matrix, by processing the matrix to get analysis coefficients for terms in the items and/or by any machine language processing algorithm such as SVM or knn which generate term weights as an outcome of feature analysis.

In block 245, the Category Content Processor module 136 may store the category profile for each of the taxonomy categories in the Taxonomy Content Repository 144. The Category Content Processor module 136 may repeat blocks 241-245 for each category within the taxonomy. Once the Category Content Processor module 136 has processed all of the categories within the taxonomy, in block 260, the Category Content Processor module 136 may notify the Taxonomy Merge Program module 138.

FIG. 3 illustrates an exemplary flow diagram of a taxonomy merge process performed by the Taxonomy Merge Program module 138 by which one or more taxonomies are merged to create a new taxonomy T' in accordance with exemplary embodiments of the present disclosure. The Taxonomy Merge Program module 138 may use an efficient tree traversal algorithm such as, but not limited to, a depth-first or breadth-first search to walk the first taxonomy and visit each category. The flow diagram may begin at block 310.

In block 310, to create a new taxonomy T', the Taxonomy Merge Program module 138 may prompt a user to select a taxonomy type for the new taxonomy T'. Taxonomy types may include, for example, a reference taxonomy, a display taxonomy, a location taxonomy, a subject taxonomy, etc., as discussed above.

In block 320, the Taxonomy Merge Program module 138 may prompt a user to select and/or build a comparator function. The comparator function may be used by the Taxonomy Merge Program module 138 to identify a match. A match may be defined as a relationship between content profiles being above a pre-specified threshold. The Taxonomy Merge Program module 138 may compare a first category profile to a second category profile to determine whether a match exists, which will be discussed in further detail below.

In block 330, the Taxonomy Merge Program module 138 may prompt the user to choose N taxonomies for merging, where N may be a positive integer (i.e, 1, 2, 3, ... ).

In block 334, the Taxonomy Merge Program Module 138 may determine if N=1. If N=1, the flow diagram 300 may continue to block 338. If N does not equal 1, then the flow diagram 300 may continue to block 340.

In block 338, the Taxonomy Merge Program Module 138 may determine that the new taxonomy $T_i$ is identical to the original taxonomy $T_N$ and may store the original taxonomy $T_{N=1}$ in the taxonomy content repository as new taxonomy T'.

In block 340, the Taxonomy Merge Program Module 138 may order the N different taxonomies $T_i$ by the number of categories M in each taxonomy. For example, a taxonomy $T_1$ may include $M_1=5$ categories and a taxonomy $T_2$ may include $M_2=3$ categories.

Block 350 illustrates an exemplary flow diagram of a taxonomy merge process performed by the Taxonomy Merge Program Module 138 by which two or more taxonomies are merged as the union of the many taxonomies to create a new taxonomy T' in accordance with exemplary embodiments of the present disclosure. This new taxonomy may be a reference taxonomy, as discussed above, created as a superset of the many source taxonomies. Other taxonomies may be created as the intersection of the source taxonomy or based on the similarity of the source taxonomies as expressed by the comparator function.

In block 350, the Taxonomy Merge Program Module 138 may create a category list t' for the new taxonomy T'. The category list t' may be the superset of all of the categories of all of the N taxonomies. The Taxonomy Merge Program Module 138 may merge each category $t_{ij}$ within each taxonomy $T_i$, where i=1 ... N and j=1 ... $M_i$, to create the new taxonomy T'.

In block 351, the Taxonomy Merge Program Module 138 may set the new taxonomy T' to include the categories and mappings of $T_1$ and set the intra-category mapping weights equal to 1.

In block 352, for each taxonomy $T_i$, where i=2 ... N, for each category $t'_k$ in the new Taxonomy T', where k=1 ... M', and for each category $t_{ij}$, where j=1 ... $M_i$, the Taxonomy Merge Program Module 138 may perform blocks 360, 361, 362, 364, and 366, as discussed below.

In block 360, the Taxonomy Merge Program Module 138 may merge categories $t_{ij}$ into taxonomy T' by applying the comparator function to compare the category profile of category $t_{ij}$ to all of the category profiles of categories $t'_k$ within taxonomy T'. The Taxonomy Merge Program Module 138 may compare the category profile of $t'_k$ to the category profile of each category $t_{ij}$ in the taxonomy $T_i$.

In block 361, if the Taxonomy Merge Program Module 138 identifies a match between a category profile of category $t_{ij}$ and a category profile of category $t'_k$ within taxonomy T', the flow diagram 300 may continue to block 362. If the Taxonomy Merge Program Module 138 does not identify a match between a category profile of category $t_{ij}$ and a category profile of category $t'_k$ within taxonomy T', the flow diagram 300 may continue to block 364.

In block 362, the Taxonomy Merge Program Module 138 may increment the category mapping weight between category $t_k$ and its parent category within taxonomy T' and may store the mapping weight in the Taxonomy Content Repository 144.

In block 364, the Taxonomy Merge Program Module 138 may add category $t_{ij}$ to the new taxonomy T' and, in block 366, may place the category $t_{ij}$ in an unmatched mapping list as $t'_{k+1}$. where "1" may be the number of new categories added to T'. Subsequent unmatched categories, if any are identified, would be added to the unmatched mapping list as $t'_{k+2}$, $t'_{k+3}$, etc. The Taxonomy Merge Program Module 138 may then store category $t_{ij}$ in the Taxonomy Content Repository 144. The flow diagram 300 may return to block 352 until all categories $t_{ij}$ of each of the taxonomies $T_2, \ldots, T_N$ have been compared to the categories $t'_{k+i}$, etc., of taxonomy T'.

In block 370, the Taxonomy Merge Program Module 138 may create intra-taxonomy mappings.

FIG. 4 illustrates an exemplary flow diagram of an intra-taxonomy category mapping process performed by the Taxonomy Merge Program Module 138 by which one or more taxonomies are merged to create a new taxonomy T' in accordance with exemplary embodiments of the present disclosure.

Intra-taxonomy mappings may associate categories in the same taxonomy to create taxonomies as hierarchical trees with categories having parent-child relationships. These relationships may partition the controlled vocabulary into sub-trees of categories, which may facilitate categorization and may improve usability for information retrieval.

The Taxonomy Merge Program Module 138 may, for example, walk down two taxonomies and may create associations between categories in the new taxonomy from categories from the different source taxonomies having identical or near identical category profiles.

Block 400 illustrates an exemplary flow diagram of an intra-taxonomy mapping process performed by the Taxonomy Merge Program Module 138 by which the mappings are created when two or more taxonomies are merged as the union of the many taxonomies to create a new taxonomy T' in accordance with exemplary embodiments of the present disclosure.

In block 410, the Taxonomy Merge Program Module 138 may retrieve a category list $t'_k$, where k=1 ... $M_1$ from the new taxonomy T'. The category list $t'_k$ may be the set of all categories from the taxonomy T'.

In block 420, the Taxonomy Merge Program Module 138 may retrieve an unmatched mapping list $t'_i$, where i=(M'-$M_1$) ... M' from the new taxonomy T'. The unmatched mapping list $t'_i$ may be the set of all unmatched categories from the taxonomies $T_i$, i=2 ... N.

In block 421, the Taxonomy Merge Program Module 138 may use a comparator function to compare a category profile of category $t'_i$ to the category profiles of categories $t'_k$. In an exemplary embodiment, the Taxonomy Merge Program Module 138 may create a mapping with a weight of 1 by applying the comparator function to compare the category profile of category $t'_i$ to the category profiles of categories $t'_k$ within taxonomy T'. The Taxonomy Merge Program Module 138 may compare the category profile of $t'_k$ to the category profile of each category $t'_i$ in the next taxonomy $T_i$.

In block 422, if the Taxonomy Merge Program Module 138 identifies a near match between a category profile of category $t'_i$ and a category profile of category $t'_k$ within taxonomy T', the flow diagram may continue to block 424. The Taxonomy Merge Program Module 138 may identify a near match if the result of the comparator function is greater than a near match threshold as specified in block 320.

If the Taxonomy Merge Program Module 138 does not identify a match between a category profile of category $t'_i$ and a category profile of category $t'_k$ within taxonomy T', the Taxonomy Merge Program Module 138, the flow diagram may continue to block 426.

In block 424, the Taxonomy Merge Program Module 138 may increment the category mapping weight between category $t'_k$ and its parent category within taxonomy T' and may store the mapping weight in the Taxonomy Content Repository 144.

In block 426, the Taxonomy Merge Program Module 138 may compare the category profile of category $t'_i$ to a function of groups of categories, such as the average of the comparator function results from comparing the category profiles of all categories $t'_k$ within taxonomy T' which have the same parent category. If the result of the comparator function is a near match, the Taxonomy Merge Program Module 138 may proceed to block 424. If the result of the comparator function is not a near match, the Taxonomy Merge Program Module 138 may increment i and may return to the beginning of block 420.

Figure 5:
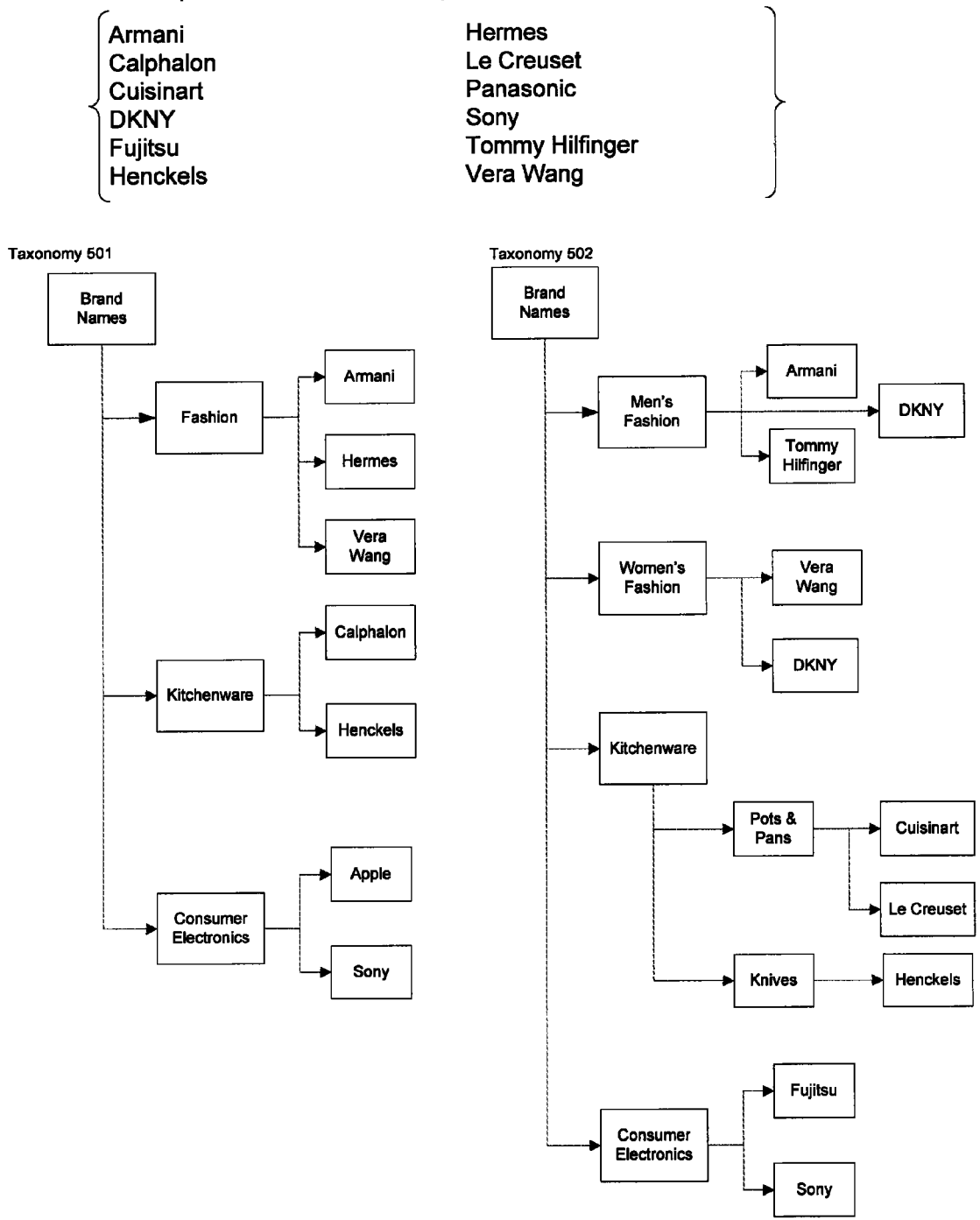
FIG. 5 shows an example of a controlled vocabulary and two different exemplary taxonomies in accordance with exemplary embodiments of the present disclosure.

FIG. 5 shows an example of a controlled vocabulary 500 and two different exemplary taxonomies 501 and 502. The controlled vocabulary 500 consists of vendor brand names, and the taxonomies 501 and 502 represent two examples of the controlled vocabulary 500 organized into different hierarchies. Taxonomies 501 and 502 illustrate categories of the controlled vocabulary 500 and subcategories within the categories. For example, taxonomy 501 includes the categories "Fashion" and "Kitchenware" and taxonomy 502 includes the categories "Men's Fashion", "Women's Fashion", "Kitchenware", and "Consumer Electronics". The category "Kitchenware" further contains sub-categories "Pots & Pans" and "Knives."

Figure 6:
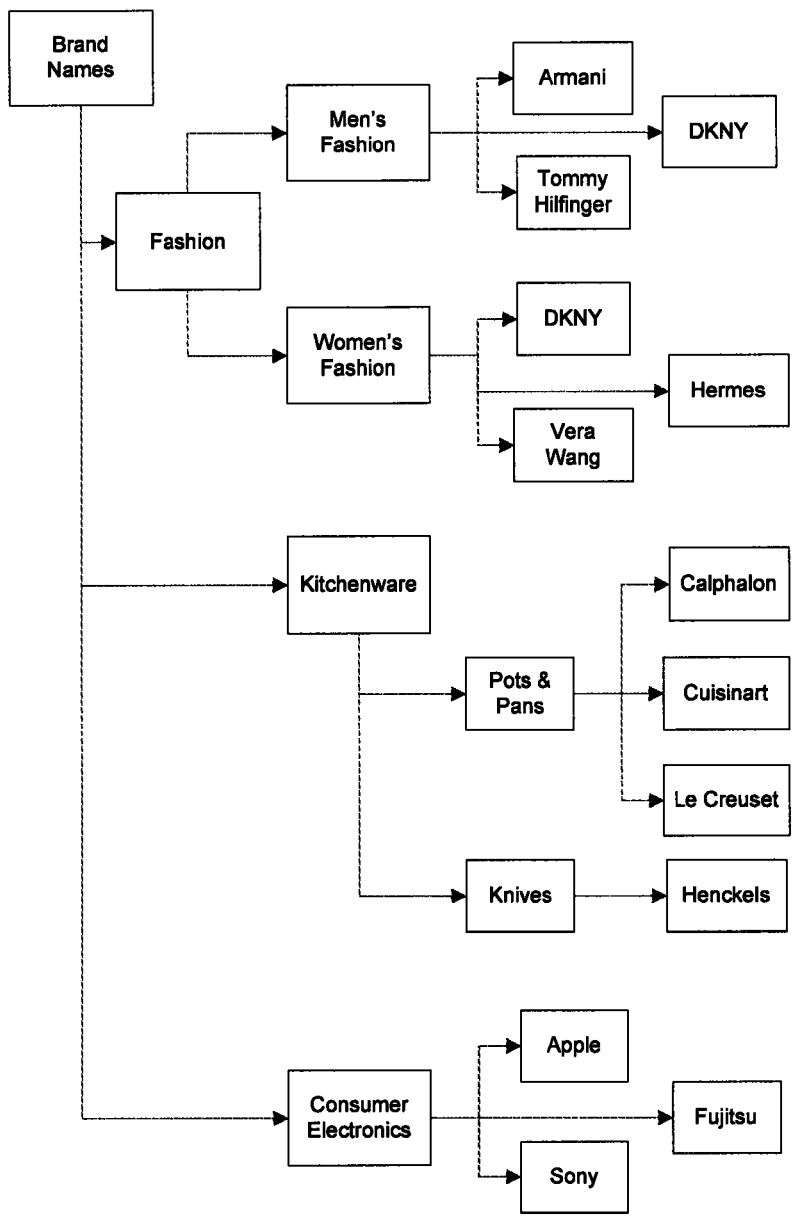
FIG. 6 shows an example of an exemplary taxonomy created as a superset of two different exemplary in accordance with exemplary embodiments of the present disclosure.

FIG. 6 shows an example of an exemplary taxonomy 601 created as a superset of the taxonomies 501 and 502 using the methods and apparatus embodied in this disclosure. For example, taxonomy 601 includes the categories "Fashion" and "Kitchenware" from taxonomy 501 and the categories "Men's Fashion", "Women's Fashion", "Kitchenware", and "Consumer Electronics" from taxonomy 502.

Thus, exemplary embodiments disclose a method and apparatus for managing associated single and multiple taxonomies in accordance with exemplary embodiments of the present disclosure. The exemplary embodiments may be used to manage a single, homogeneous taxonomy created from multiple, similar taxonomies. The exemplary processes and tools described herein may be employed to manage taxonomies through: taxonomy categorization, manual taxonomy categorization and automatic information query categorization, administrative function taxonomy tool, automated taxonomy creation and categorization and taxonomy mapping and error analysis, and taxonomy history creation and administration on mobile devices. The exemplary taxonomy management methods and apparatuses may be implemented using computer software and hardware information search and retrieval platforms for mobile devices, in analyzing and categorizing queries for information.

The exemplary embodiments may aide in the creation, maintenance, and management of taxonomies. The exemplary embodiments may be used for, but not limited to, developing subject and function taxonomies (e.g. music genres or product types), translation dictionaries, proper noun dictionaries (e.g. people, places, and things), and geographic taxonomies (e.g. country, state, county, city taxonomies). Administrative functions of the exemplary embodiments may include taxonomy and category (i.e. taxonomy node) creation, versioning, update, metadata creation, and annotation. Workflow functions include automated and manual taxonomy and category creation review and approval.

The exemplary embodiments also may facilitate the creation and maintenance of user and role access control lists to provide secure change operations.

According to an exemplary embodiment of the present disclosure, the systems and processes described in this disclosure may be implemented on any general or special purpose computational device, either as a standalone application or applications, or even across several general or special purpose computational devices connected over a network and as a group operating in a client-server mode. According to another embodiment of the disclosure, a computer-usable and writeable medium having a plurality of computer readable program code stored therein may be provided for practicing the process of the present disclosure. The process and system of the present disclosure may be implemented within a variety of operating systems, such as a Windows® operating system, various versions of a Unix-based operating system (e.g., a Hewlett Packard or a Red Hat Linux version of a Unix-based operating system), or various versions of an AS/500-based operating system. For example, the computer-usable and writeable medium may be comprised of a CD ROM, a floppy disk, a hard disk, or any other computer-usable medium. One or more of the components of the system or systems embodying the present disclosure may comprise computer readable program code in the form of functional instructions stored in the computer-usable medium such that when the computer-usable medium is installed on the system or systems, those components cause the system to perform the functions described. The computer readable program code for the present disclosure may also be bundled with other computer readable program software. Also, only some of the components may be provided in computer-readable code.

Additionally, various entities and combinations of entities may employ a computer to implement the components performing the above-described functions. According to an embodiment of the disclosure, the computer may be a standard computer comprising an input device, an output device, a processor device, and a data storage device. According to other embodiments of the disclosure, various components may be computers in different departments within the same corporation or entity. Other computer configurations may also be used. According to another embodiment of the disclosure, various components may be separate entities such as corporations or limited liability companies. Other embodiments, in compliance with applicable laws and regulations, may also be used.

According to one specific embodiment of the present disclosure, the system may comprise components of a software system. The system may operate on a network and may be connected to other systems sharing a common database and common servers operating additional data or application services. Other hardware arrangements may also be provided.

Other embodiments, uses and advantages of the present disclosure will be apparent to those skilled in the art from consideration of the specification and practice of the disclosure disclosed herein. The specification and examples should be considered exemplary only. The intended scope of the disclosure is only limited by the claims appended hereto.

While the disclosure has been particularly shown and described within the framework of claims processing, it will be appreciated that variations and modifications can be effected by a person of ordinary skill in the art without departing from the scope of the disclosure. Furthermore, one of ordinary skill in the art will recognize that such processes and systems do not need to be restricted to the specific embodiments described herein.

The invention claimed is:

1. A computer implemented method for managing taxonomies comprising:
   retrieving a first taxonomy comprising a first plurality of categories;
   retrieving one or more second taxonomies, a second plurality of categories being associated with the one or more second taxonomies;
   analyzing a set of content profiles for content of the first taxonomy using evidence terms from content items;
   generating, using a computer processor, a category profile for at least one of the first plurality of categories of the first taxonomy based at least in part on the analysis of the set of content profiles for content of the first taxonomy;
   comparing a category profile of each of the first plurality of categories to a category profile of each of the second plurality of categories using an automated tree traversal algorithm to identify matching categories and non-matching categories, wherein the comparing comprises applying a comparator function that identifies a match when a comparison between category profiles is above a threshold value; and
   creating a third taxonomy that includes the matching categories and the non-matching categories, wherein the creation of the third taxonomy comprises a taxonomy workflow process including review and approval of a plurality of tasks in a specified order;
   wherein the first taxonomy, the one or more second taxonomies, and the third taxonomy each comprise a controlled vocabulary organized hierarchically to represent relationships between terms in the controlled vocabulary, and wherein categories of the first taxonomy, the one or more second taxonomies, and the third taxonomy each comprise at least one labeled vocabulary term.

2. The method of claim 1, wherein each of the first plurality of categories and each of the second plurality of categories are associated with one or more content items.

3. At least one non-transitory processor readable storage medium for storing a computer program of instructions configured to be readable by at least one processor for instructing the at least one processor to execute a computer process for performing the method as recited in claim 1.

4. A computer implemented method for managing taxonomies comprising:
   retrieving a first taxonomy comprising at least one first category and one or more second taxonomies, at least one second category being associated with at least one of the one or more second taxonomies;
   analyzing a set of content profiles for content of the first taxonomy using evidence terms from content items;
   generating, using a computer processor, a category profile for the at least one first category of the first taxonomy based at least in part on the analysis of the set of content profiles for content of the first taxonomy; and
   creating a new taxonomy by merging the first taxonomy with the second taxonomy based on a comparison of a first category profile of the at least one first category with a second category profile of the at least one second category, wherein the comparing comprises applying a comparator function that identifies a match when a comparison between category profiles is above a threshold value, wherein the first taxonomy, the one or more second taxonomies, and the new taxonomy each comprise a controlled vocabulary organized hierarchically to represent relationships between terms in the controlled vocabulary, and wherein categories of the first taxonomy, the one or more second taxonomies, and the new taxonomy each comprise at least one labeled vocabulary term, wherein the creation of the new taxonomy comprises a taxonomy workflow process including review and approval of a plurality of tasks in a specified order.

5. The method of claim 4, further comprising receiving a selection of a taxonomy type.

6. The method of claim 4, where in the event that the comparison is not above the threshold, further comprising adding both the at least one first category and the at least one second category to the new taxonomy.

7. The method of claim 4, where in the event that the comparison is above the threshold, further comprising:
   adding the at least one first category to the new taxonomy; and
   creating an association between the at least one first category and the at least one second category.

8. The method of claim 4, further comprising ordering the first taxonomy relative to the second taxonomy based on which of the first taxonomy and the second taxonomy includes a greater number of categories.

9. The method of claim 4, further comprising creating a category list comprising the at least one first category and the at least one second category.

10. The method of claim 4, further comprising creating intra-taxonomy mappings to associate the at least one first category with the at least one second category in the new taxonomy.

11. The method of claim 4, wherein category profiles are generated using a machine learning process.

12. The method of claim 4, wherein category profiles are generated using k-Nearest Neighbor (knn) classification.

13. The method of claim 4, further comprising creating an inter-taxonomy mapping for the new taxonomy.

14. The method of claim 13, wherein the inter-taxonomy mapping creates parent-child relationships between categories in the new taxonomy.

15. The method of claim 13, wherein the inter-taxonomy mapping creates a tree structure in the new taxonomy.

16. The method of claim 4, wherein category profiles are generated using Support Vector Machines (SVM).

17. A system comprising:
   a first content source communicatively coupled to a network, the first content source to store a first taxonomy having at least one first category;
   a second content source communicatively coupled to the network, the second content source to store a second taxonomy having at least one second category;
   a client device communicatively coupled to a network, the client device to generate data identifying a first taxonomy and a second taxonomy; and
   a server communicatively coupled to the network, the server to receive the data and to retrieve the first taxonomy and the second taxonomy, and to analyze a set of content profiles for content of the first taxonomy using evidence terms from content items, the server being further configured to generate a category profile for at least one first category of the first taxonomy based at least in part on the analysis of the set of content profiles for content of the first taxonomy and to create a new taxonomy by merging the first taxonomy with the second taxonomy based on a comparison of the first category profile of the at least one first category with a second category profile of the at least one second category, wherein the comparison comprises applying a comparator function that identifies a match when a comparison between category profiles is above a threshold value, wherein the creation of the new taxonomy comprises a taxonomy workflow process including review and approval of a plurality of tasks in a specified order;

wherein the first taxonomy and the second taxonomy each comprise a controlled vocabulary organized hierarchically to represent relationships between terms in the controlled vocabulary, and wherein categories of the first taxonomy and the second taxonomy each comprise at least one labeled vocabulary term.

18. A system comprising:
one or more processors communicatively coupled to a network; wherein the one or more processors are configured to:
retrieve a first taxonomy and a second taxonomy from one or more content sources, the first taxonomy having at least one first category and the second taxonomy having at least one second category;
analyze a set of content profiles for content of the first taxonomy using evidence terms from content items;
generate a first category profile for the at least one first category and a second category profile for the at least one second category based at least in part on the analysis of the set of content profiles for content of the first taxonomy and the second taxonomy; and
create a new taxonomy by merging the first taxonomy with the second taxonomy based on a comparison of the first category profile with the second category profile, wherein the comparison comprises applying a comparator function that identifies a match when a comparison between category profiles is above a threshold value, wherein the creation of the new taxonomy comprises a taxonomy workflow process including review and approval of a plurality of tasks in a specified order;
wherein the first taxonomy, the second taxonomy, and the new taxonomy each comprise a controlled vocabulary organized hierarchically to represent relationships between terms in the controlled vocabulary, and wherein categories of the first taxonomy, the second taxonomy, and the new taxonomy each comprise at least one labeled vocabulary term.

19. A computer implemented method for managing taxonomies comprising:
retrieving a first taxonomy comprising a first plurality of categories;
retrieving one or more second taxonomies, a second plurality of categories being associated with the one or more second taxonomies;
building, using a computer processor, category profiles for each retrieved taxonomy based on machine learning algorithms;
comparing the category profile of each of the first plurality of categories to the category profile of each of the second plurality of categories to identify matching categories and non-matching categories; and
creating a set of associations between similar categories in the first taxonomy and the second set of taxonomies, wherein the creation of the set of associations comprises a taxonomy workflow process including review and approval of a plurality of tasks in a specified order;
wherein the first taxonomy and the one or more second taxonomies each comprise a controlled vocabulary organized hierarchically to represent relationships between terms in the controlled vocabulary, and wherein categories of the first taxonomy and the one or more second taxonomies each comprise at least one labeled vocabulary term.

20. A method comprising:
retrieving, using a computer processor, a first taxonomy comprising at least one first category and one or more second taxonomies, at least one second category being associated with at least one of the one or more second taxonomies; and
creating a set of associations between one or more categories of the first taxonomy and one or more categories of the second taxonomy based on a comparison of a category profile in the first taxonomy with a category profile in the second taxonomy, wherein the creation of the set of associations comprises a taxonomy workflow process including review and approval of a plurality of tasks in a specified order;
wherein the first taxonomy and the one or more second taxonomies each comprise a controlled vocabulary organized hierarchically to represent relationships between terms in the controlled vocabulary, and wherein categories of the first taxonomy and the one or more second taxonomies each comprise at least one labeled vocabulary term.

* * * * *